(12) United States Patent
Mayorga Lopez et al.

(10) Patent No.: US 8,968,951 B2
(45) Date of Patent: Mar. 3, 2015

(54) INTELLIGENT SYSTEM FOR THE DYNAMIC MODELING AND OPERATION OF FUEL CELLS

(76) Inventors: Rene Virgilio Mayorga Lopez, Regina (CA); Shoumin Song, Regina (CA)

( * ) Notice: Subject to any disclaimer, the term of this patent is extended or adjusted under 35 U.S.C. 154(b) by 1416 days.

(21) Appl. No.: 12/161,504

(22) PCT Filed: Jan. 23, 2007

(86) PCT No.: PCT/CA2007/000088
§ 371 (c)(1), (2), (4) Date: Jul. 18, 2008

(87) PCT Pub. No.: WO2007/082390
PCT Pub. Date: Jul. 26, 2007

(65) Prior Publication Data
US 2010/0227236 A1 Sep. 9, 2010

Related U.S. Application Data

(60) Provisional application No. 60/760,968, filed on Jan. 23, 2006.

(51) Int. Cl.
H01M 8/04 (2006.01)
G06N 7/08 (2006.01)
H01M 8/10 (2006.01)

(52) U.S. Cl.
CPC ............. *G06N 7/08* (2013.01); *H01M 8/04305* (2013.01); *H01M 8/1067* (2013.01); *H01M 2008/1095* (2013.01); *Y02E 60/521* (2013.01)
USPC .............. 429/432; 429/428; 429/431; 700/28

(58) Field of Classification Search
USPC .............................. 429/428, 431, 432; 700/28
See application file for complete search history.

(56) References Cited

U.S. PATENT DOCUMENTS

2003/0198851 A1* 10/2003 Sone et al. ................ 429/30
2004/0028989 A1* 2/2004 Sun et al. ................ 429/40
2004/0107011 A1 6/2004 Moselli et al.
2004/0191600 A1 9/2004 Gyoten et al.
2005/0181254 A1* 8/2005 Uensal et al. ................ 429/33
2006/0263651 A1* 11/2006 Fagley et al. ................ 429/13

FOREIGN PATENT DOCUMENTS

WO    WO 98/40951 A1    9/1998

OTHER PUBLICATIONS

Jemei S. et al., "On-board fuel cell power supply modeling on the basis of neural network methodology" Journal of Power Sources, vol. 124, No. 2, Nov. 24, 2003, pp. 479-486.
Sun T. et al., "Modelling and control PEMFC using fuzzy neural networks", J Zhejiang Univ Sci 2005, 6A(10), pp. 1084-1089.
Li Y. et al., "Using Artificial Neural Network to Control the Temperature of Fuel Cell", Communications, Circuits and Systems Proceedings, 2006 International Conference, Jun. 2006, vol. 3, pp. 2159-2162.
Iwase et al., "Fuel Cell Power Generation Plant", Patent Abstracts of Japan, JP 04087263, Mar. 19, 1992, Abstract.

* cited by examiner

*Primary Examiner* — Ula C. Ruddock
*Assistant Examiner* — Frank Chernow

(57) ABSTRACT

A system and method for controlling an output of a dynamic fuel cell is provided. A dynamic fuel cell has a membrane wherein a dimension of the membrane is variable during operation of the dynamic fuel cell in response to a control signal from an intelligent controller. By varying the dimension of the membrane, the output voltage of the dynamic fuel cell can be altered. An intelligent controller is provided that can measure a number of outputs and input parameters of the dynamic fuel cell and approximate input parameters using the measured values to adjust the input of the dynamic fuel cell to the approximated values.

26 Claims, 14 Drawing Sheets

INTELLIGENT SYSTEM FOR THE DYNAMIC MODELING AND OPERATION OF FUEL CELLS

CROSS-REFERENCE TO RELATED APPLICATION

The present application claims the benefit of prior provisional application Ser. No. 60/760,968, filed Jan 23, 2006, the contents of which are hereby incorporated herein by reference.

This invention is in the field of fuel cell control systems and more particularly to a method and system for controlling a voltage output of a fuel cell by varying a number of input parameters.

BACKGROUND

Fuels cells operate by generating electricity electromechanically. A fuel and an oxidant are provided to the fuel cell where they react in the presence of an electrolyte to generate electricity. Although various fuels and oxidants can be used, the most common are likely hydrogen and oxygen because the byproducts of a hydrogen fuel cell are rather harmless; mostly just water.

In a typical hydrogen/oxygen fuel cell, the hydrogen and oxygen are initially separated in the fuel cell by a membrane. The hydrogen, reacting with a catalyst, disassociates into protons and electrons. The disassociated protons pass through the membrane to the oxygen on the other side of the membrane, while the electrons are used to power an external circuit. On the oxygen side of the membrane, the protons, oxygen and electrons (which are reintroduced after traveling through the external circuit) react to form water and water vapor before the water and water vapor exits the fuel cell.

Current fuel cell designs are rather static; that is, they are designed to deliver power output which is preset to a certain value or within a relatively narrow power range. These fuel cell designs that deliver a fixed power output normally operate at a set temperature with a constant membrane thickness and fuel concentration. The fuel cell designs that allow a limited capability to deliver power in a relatively narrow range normally operate at a fixed temperature keeping constant membrane dimensions, such as thickness, and varying the fuel concentration. However, these designs do not have a high degree of flexibility in their ability to vary the fuel concentration because too much variation will cause fuel crossover through the membrane, which will decrease the fuel efficiency and adversely affect the performance of the fuel cell. Therefore, the variation of fuel concentration of these fuel cells is somewhat limited which in turn limits the operating range of the fuel cell.

Typically, for applications where substantial variations in voltage/current output is required, complex electrical systems are required after the fuel cell which requires power conversion from the output of the fuel cell to be compatible with the load being driven. These system usually also include a battery system to provide short bursts of increased demand. The fuel cell design and inputs are typically designed in these systems to produce a voltage output that is usually greater than the demanded load, so that system can step down the power output from the fuel cell to provide the necessary voltage demanded. However, in this method, some efficiency is sacrificed because the fuel cell is purposely kept in an overproducing state.

There have been some attempts to increase the input parameters of fuel cells, for example, U.S. Pat. No. 6,794,855 to Hochgraf et al. discloses a control system for a fuel cell that provides temperature control in addition to controlling fuel and oxygen input, but is still limited in the input parameters it can solve for and control in real time.

SUMMARY OF THE INVENTION

It is an object of the present invention to provide a system and method that overcomes problems in the prior art.

In a first aspect, a system for controlling an output of a fuel cell is provided. The system comprises: a fuel cell having a membrane and an output voltage, the membrane having at least one membrane dimension that is variable during operation of the fuel cell and wherein varying the at least one dimension of the membrane results in changing the voltage output of the fuel cell; and an intelligent controller in communication with the fuel cell, the controller operative to control the output voltage of the fuel cell by approximating at least one input parameter using a nonlinear process model and adjusting an input of the fuel cell to the approximated at least one input parameter.

In another aspect, a method for controlling an output of a fuel cell having a membrane and operative to vary at least one dimension of the membrane is provided. The method comprises: using a desired output voltage, approximating a value for at least one input parameter of the fuel cell using at least one of: an artificial neural network, a fuzzy inference system, a neuron-fuzzy inference system and an advanced inference system; and adjusting the at least one input parameter of the fuel cell to the approximated value, wherein the at least one input parameter comprises the at least one dimension of the membrane in the fuel cell.

In another aspect, a method for controlling an output of a fuel cell having a membrane and operative to vary at least one dimension of the membrane is provided. The method comprises: using a desired output voltage and a measured at least one dimension of the membrane of the fuel cell, approximating a value for at least one input parameter of the fuel cell, other than the at least one dimension of the membrane, using at least one of: an artificial neural network, a fuzzy inference system and a neuron-fuzzy inference system; and adjusting the least one input parameter of the fuel cell to the approximated value.

In another aspect, a fuel cell for producing a voltage output is provided. The fuel cell comprises: at least on anode layer operative to receive a fuel; at least one cathode layer operative to receive an oxidant; and a membrane separating the at least one anode layer and at least one cathode layer, the membrane having at least one dimension that is variable during operation of the fuel cell. Varying the at least one dimension of the membrane of the fuel cell results in changing the voltage output of the fuel cell.

Current fuel cells have similar features. They all have an anode (catalyst) layer, a cathode (catalyst) layer and a porosity gas distribution layer (membrane). These layers including the porosity gas distribution layer (the membrane) are treated as static constants in conventional control systems because the membrane thickness of current fuel cells cannot be varied dynamically while the fuel cell is in operation. By using a dynamic fuel cell that allows dimensions of the membranes, such as the thickness of the membrane and/or the contact area of the membrane with an anode layer and cathode layer, to be varied during operation of the dynamic fuel cell, a wide range of voltage output can be achieved with an intelligent control system that can approximate one or more input parameters and adjust these input parameters to the dynamic fuel cell to result in a desired or demanded output voltage.

DESCRIPTION OF TILE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
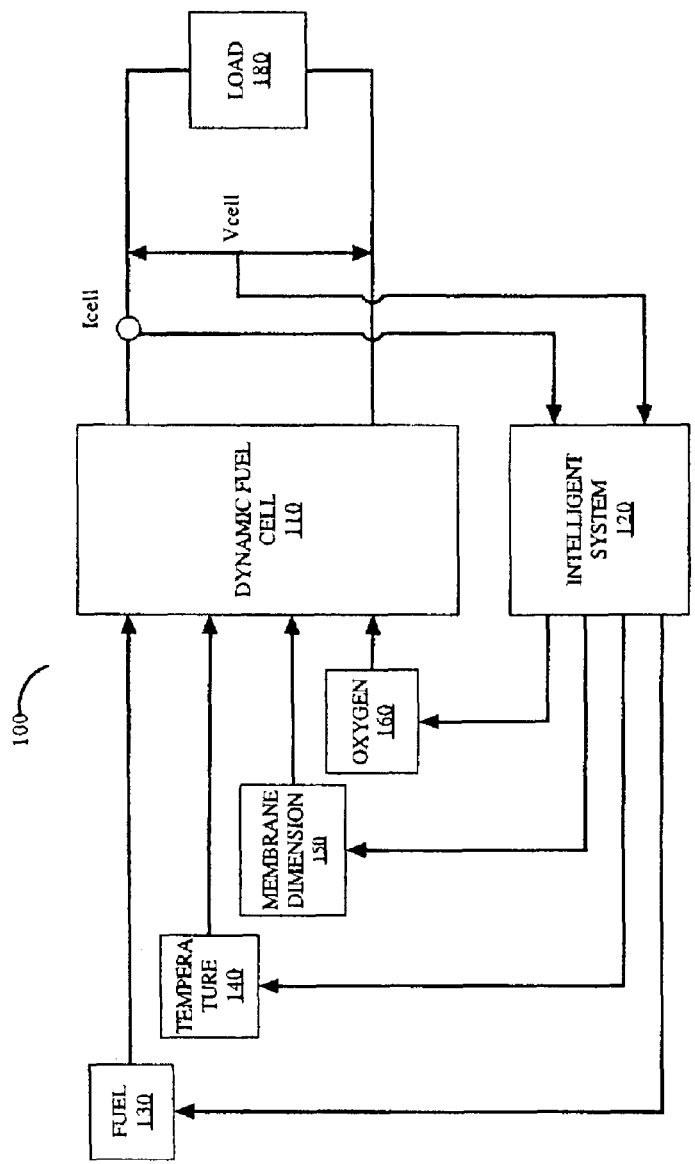
FIG. 1 is a schematic illustration of a dynamic fuel cell control system.

FIG. 1 illustrates a schematic illustration of a fuel cell control system 100. The control system 100 comprises: a dynamic fuel cell 110; an intelligent controller 120; fuel input system 130; a temperature control system 140; a membrane dimension control system 150; an oxygen supply system 160; and a load 180.

The dynamic fuel cell 110 uses a fuel, such as hydrogen, methanol or any other fuel suitable to be used in a fuel cell, to generate an output voltage, $V_{cell}$, and output current, $I_{cell}$, which is supplied to a toad 180. In a general aspect, the dynamic fuel cell 110 can be square, rectangular, circular, cylindrical, ball or tube type and of variable configuration. The anode, cathode and or membrane dimension parameters can be appropriately varied according to a proper operation control scheme. The dynamic fuel cell 110 is operative to vary at least one dimension of a membrane in the dynamic fuel cell 110 in response to a control signal from the intelligent controller 120.

Fuel cell control system 100 has a number of systems that provide input to the dynamic fuel cell 110. These systems include: a fuel input system 130; a temperature control system 140; a membrane dimension control system 150; and an oxygen supply system 160.

The fuel input system 130 provides the fuel to the dynamic fuel cell 110. For example, for a hydrogen fuel cell, the fuel input system 130 supplies the needed hydrogen to the dynamic fuel cell 110, although the fuel input system 130 could also be used to supply any type of fuel that can used in the dynamic fuel cell 110. The fuel inputs system 130 has a number of controllable variables in its supply of fuel to the dynamic fuel cell 110. These variables include the concentration of the incoming fuel, the pressure of the incoming fuel and/or the velocity of the incoming fuel.

The temperature control system 140 is operative to vary the operating temperature of the dynamic fuel cell 110. In one aspect it could be a pressurized coolant system that can vary the flow of coolant through the dynamic fuel cell 110, in other aspects it could comprises a fan portion and/or vary the temperatures of the incoming fuel and oxygen.

The membrane dimension control system 150, in one aspect, is operative to vary the thickness of a membrane in the dynamic fuel cell 110 and, in another aspect, is operative to vary the contact area between the membrane and the incoming fuel and oxygen. These dimensions can be varied by a number of mechanical, electronic, electromagnetic, electrostatic, electro-mechanical, electro-mechanical-chemical, chemical or other mechanisms.

Figure 2:
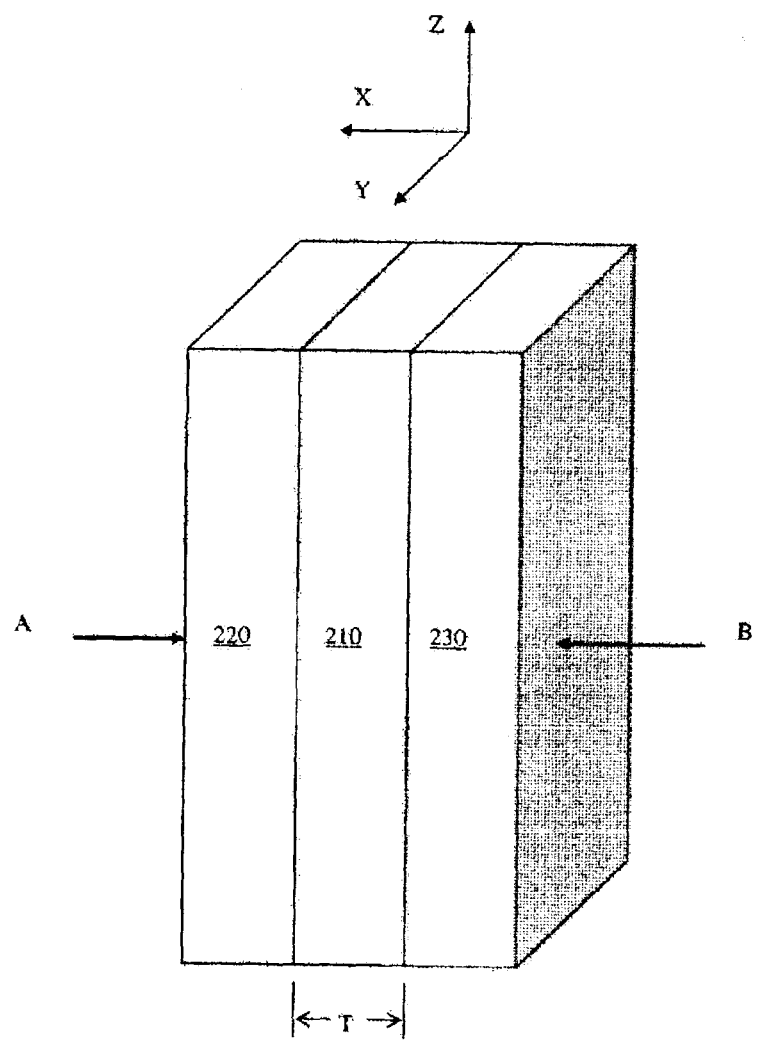
FIG. 2 is a schematic illustration of an aspect of the internal layers of a dynamic fuel cell.

FIG. 2 illustrates a schematic representation of layers making up a dynamic fuel cell 110 in one aspect. A membrane 210 is positioned in between an anode layer 220 and a cathode layer 230.

In one aspect, the thickness, T, of the membrane 210 can be varied by stretching and contracting the membrane 210. By applying a force to the membrane 210, such as a mechanical force, along the X-axis, Y-axis, Z-axis or combination of two or more, the thickness, T, of membrane 210 can be varied. Alternatively, the anode layer 220 and cathode layer 230 could be rotated slightly, for example, in a screw like manner, in relation to each other causing the thickness, T, of the membrane 210 to be varied.

Additionally, the thickness, T, of the membrane 210 can be varied by exerting pressure to the outer surfaces of both the anode layer 220 and cathode layer 230 in directions A and B. By increasing the pressure exerted on the outer surfaces of the anode layer 220 and cathode layer 230, the thickness, T, of the membrane 210 can be decreased and vice versa.

The anode layer 220 and cathode layer 230 can also be bent to produce pressure on the membrane 210 which will result in the thickness, T, of the membrane 210 being varied.

Figure 3:
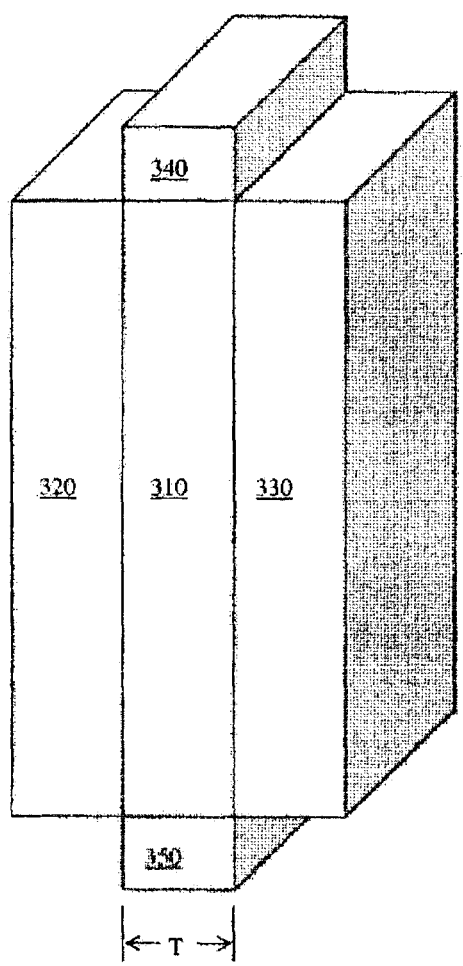
FIG. 3 is a schematic illustration of an aspect of the internal layers of a dynamic fuel cell wherein the membrane thickness is varied by electronic pulses.

FIG. 3 illustrates a schematic diagram of layers making up the dynamic fuel cell 110, shown in FIG. 1, in a further aspect. The membrane 310 thickness, T, can be varied by properly impacting pulses in the membrane 310. Membrane 310 is positioned in between an anode layer 320 and a cathode layer 330 and electrodes 340 and 350 are positioned on opposite sides of membrane 310. By making the membrane 310 of a material sensitive to electronic pulses, the thickness, T, or surface area of the membrane 310 can be varied during operation of the dynamic fuel cell 110 by passing electronic pulses through the membrane 310.

Figure 4:
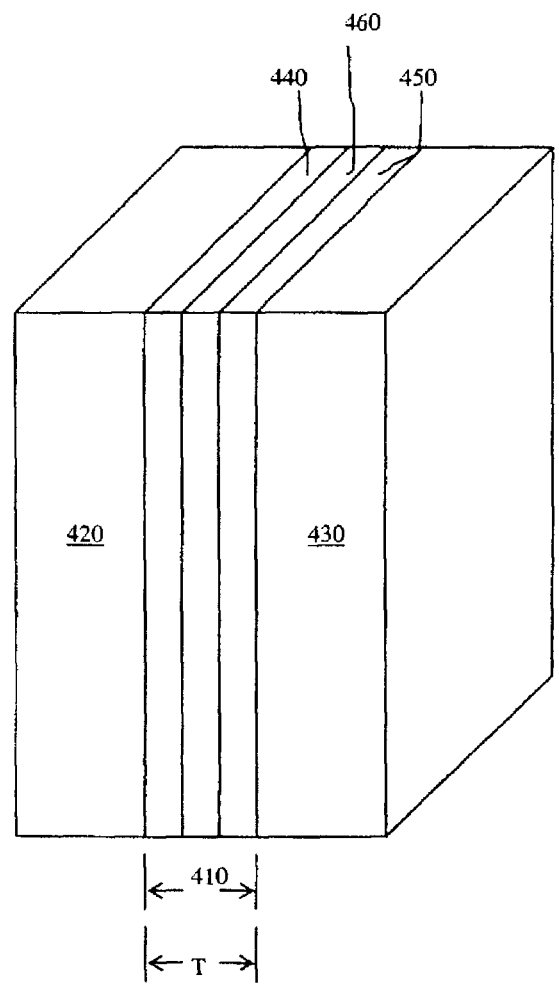
FIG. 4 is a schematic illustration of an aspect of the internal layers of a dynamic fuel cell wherein the membrane has a number of layers including a layer holding a liquid film.

FIG. 4 illustrates a schematic representation of the dynamic fuel cell 110 of FIG. 1, in a further aspect that alters the thickness, T, of a membrane 410. The membrane 410 is comprised of two outer membrane layers 440 and 450 made of a typical membrane material and an inner layer 460. The inner layer 460 contains a turn of liquid solution. By supplying and evacuating the liquid solution in the inner layer 460, the thickness, T, of the overall membrane 410 can be varied during operation of the dynamic fuel cell 110.

Additionally, the concentration of the protons in the liquid solution will also change, changing the performance of the dynamic fuel cell 110, rapidly.

Referring again to FIG. 1, in another aspect, the dimension of the membrane in the dynamic fuel cell 110 that is variable is the contact area of the membrane with the anode and cathode layers in the dynamic fuel cell 110. The dynamic fuel cell 110 is operative to vary the contact area between the membrane and the incoming fuel and oxygen. The contact area of the membrane with the anode layer and cathode layer in the dynamic fuel cell 110 is a parameter of operation of the dynamic fuel cell 110 that greatly affects the output voltage, $V_{cell}$, of the dynamic fuel cell 110. Varying the contact area of the membrane with the anode layer and/or cathode layer can be done by bending the anode layer and cathode layer with respect to the membrane respectively.

Figure 5:
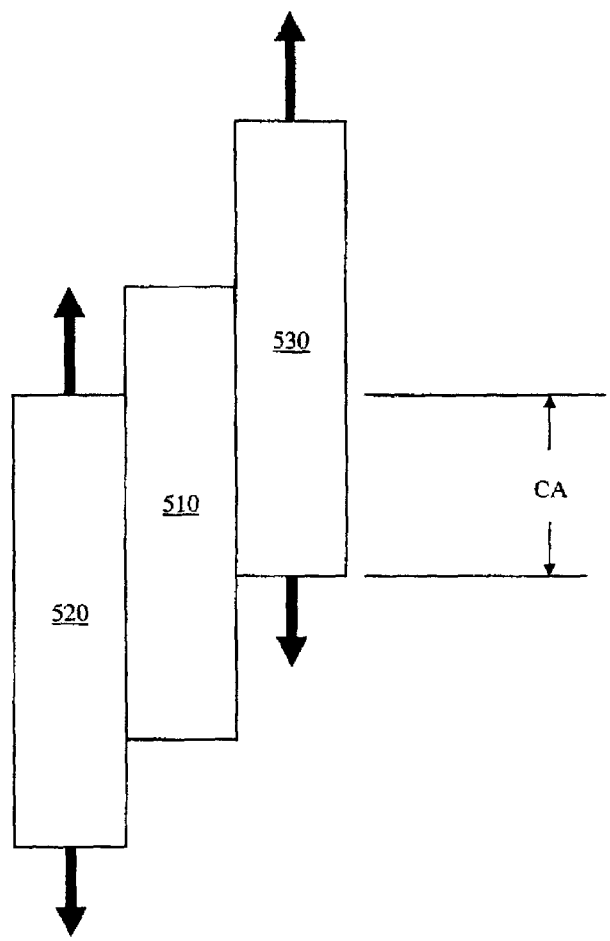
FIG. 5 is a schematic illustration of an aspect of the internal layers of a dynamic fuel cell wherein a contact surface is varied by moving a cathode layer and anode layer relative to the membrane.

FIG. 5 is a schematic illustration of a further aspect of the dynamic fuel cell 110, of FIG. 1, where a contact area, CA, between a membrane 510, an anode layer 520 and a cathode layer 530 can be varied by moving the cathode layer 530 and/or anode layer 520 relative to the membrane 510. In this manner a contact area, CA, between the membrane 510 and the anode layer 520 and the membrane 510 and the cathode layer 530 can be varied as the dynamic fuel cell 110 is operating, allowing the voltage output, $V_{cell}$, of the dynamic fuel cell 110 to be varied over a wide range. A person skilled in the art will appreciate that the anode layer 520 or cathode layer 530 could be moved alone, or alternatively the membrane 510 could be moved to vary the contact area, CA.

Figure 6:
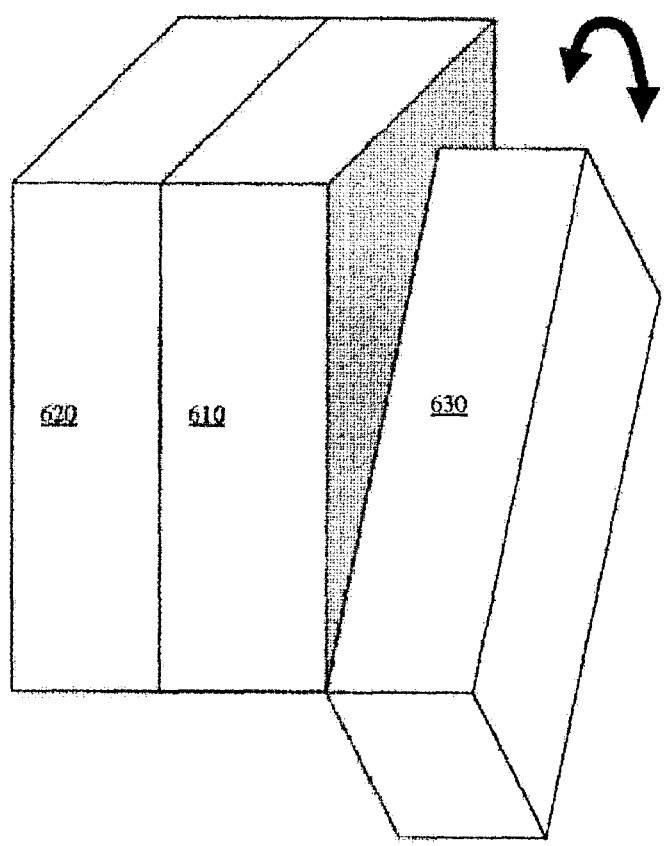
FIG. 6 is a schematic illustration of an aspect of the internal layers of a dynamic fuel cell wherein a contact surface is varied by rotating an cathode layer relative to a membrane.

FIG. 6 is a schematic illustration of a further aspect of the dynamic fuel cell 110 where a contact area is varied by rotating the cathode layer 630 relative to the membrane 610. In this manner, the contact area between the membrane 610 and the cathode layer 630 can be varied during operation of the dynamic fuel cell 110, allowing the voltage output, $V_{cell}$, of the dynamic fuel cell 110 to be varied over a wide range. A person skilled in the art will appreciate that the anode layer 620, the membrane 610 or any combination of the anode layer 620, membrane 610 and cathode layer 630 could be rotated to vary the contact area.

Referring again to FIG. 1, the oxygen supply system 160 is operative to supply the desired oxygen to the dynamic fuel cell 110. A person skilled in the art will appreciate that the oxygen supply system 160 can comprise various configurations of compressors, filters, oxygen conditioning systems, etc. The oxygen supply system 160 has a number of controllable variables in its supply of oxygen to the fuel cell 110. Some of these controllable variables include the concentration of the incoming oxygen, the pressure of the incoming oxygen and/or the velocity of the incoming oxygen.

All of these controllable variables in the fuel supply system 130, temperature control system 140, membrane dimension control system 150 and oxygen supply system 160 have a significant effect on performance of the dynamic fuel cell 110. These variables are related to the voltage output, $V_{cell}$, and current output, $I_{cell}$, of the dynamic fuel cell 110 by a complicated and highly non-linear function. By altering the variables, the performance of the dynamic fuel cell 110 can be greatly varied.

The intelligent controller 120 is operative to control the operation of the fuel supply system 130, temperature control system 140, membrane dimension control system 150 and the oxygen supply system 160, respectively. The intelligent controller 120 monitors the voltage output, $V_{cell}$, and the current output, $I_{cell}$, of the dynamic fuel cell 110 and uses these measured values to alter the variables in the fuel supply system 130, temperature control system 140, membrane dimension control system 150 and the oxygen supply to system 160. In order to control the output of the dynamic fuel cell 110 using a relatively large number of input parameters of the dynamic fuel cell 110 in real-time, the intelligent controller 120 uses a nonlinear process model such as an artificial neural network, fuzzy inference system, neuro-fuzzy inference system and or other advance inference system to quickly approximate the needed input parameters based on a demanded or desired output voltage for the dynamic fuel cell 110. The intelligent controller 120 then uses the approximated input parameters to control the variables in the fuel supply system 130, temperature control system 140, membrane dimension control system 150 and the oxygen supply system 160 to result in the dynamic fuel cell 110 providing the desired voltage output.

Figure 7:
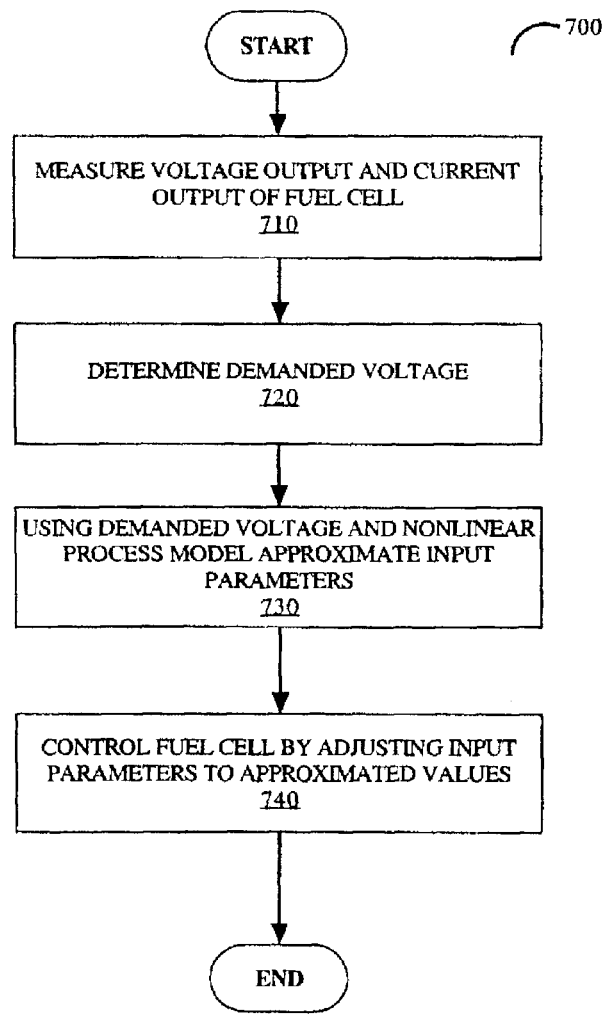
FIG. 7 is a flowchart of a method of controlling a dynamic fuel cell.

FIG. 7 is a flowchart illustrating a method 700 implemented by the intelligent controller 120 to control the voltage output of the dynamic fuel cell 110. The method 700 is continuously implemented by the intelligent controller 120 as the fuel cell control system 100 is in operation. Method 700 comprises the steps of: measuring the voltage output and current output of a fuel cell 710; determining the demanded voltage 720; using the demanded voltage and a nonlinear process model, approximating input parameters 730; and controlling the fuel cell by adjusting input parameters to the approximated values 740.

At step 710 of the method 700, the intelligent controller 120 measures the voltage output and current output of the dynamic fuel cell 110 and these measured values are then used in to determine a demanded voltage at step 720 that is demanded by the load 180.

At step 730 the method 700 uses the calculated demanded voltage and the nonlinear process model to approximate desired input parameters for the dynamic fuel cell 110.

At step 740 the intelligent controller 120 controls the dynamic fuel cell 110 by adjusting the various input parameters to match approximated input parameters determined at step 730. The intelligent controller 120 provides signals to the fuel input system 130; the temperature control system 140; the membrane dimension control system 150; and the oxygen supply system 160 which set these systems to provide the input parameters approximated by the intelligent controller 120. Operating under the adjusted input parameters, the dynamic fuel cell 110 will provide a voltage output the same as or sufficiently close to the voltage demanded by the load 180.

In this manner, the intelligent controller 120 allows real-time control of the voltage output of the dynamic fuel cell 110. As the voltage demanded or desired by the load 180 varies, the intelligent controller 120 approximates new input parameters that will produce the demanded or desired voltage (or sufficiently close voltage) and adjusts the inputs to the dynamic fuel cell 110, accordingly. By adjusting the above mentioned input parameters, a wide range of voltage outputs can be achieved with the dynamic fuel cell 110.

The intelligent controller 120 can be tuned and optimized by obtaining experimental data from an actual dynamic fuel cell 110. Outputs of the dynamic fuel cell 110 and their corresponding inputs can be recorded and used to train or tune the artificial neural network, fuzzy inference system, neuro-fuzzy inference system and/or other advanced inference system methodologies used by the intelligent controller 120. Alternatively, outputs of the dynamic fuel cell 110 and their corresponding inputs can be determined by solving mathematical functions describing the operation of the dynamic fuel cell 110 and these determined values used to tune and/or optimize the intelligent controller 120 directly. Although the complicated and highly nonlinear equations describing the operation of the intelligent controller 120 may not be solvable in real-time while the dynamic fuel cell 110 is in operation, it is often possible to solve them for various inputs and outputs given enough time. A data set to configure the intelligent controller 120 can be determined by solving for the equations to create a sufficient data set for training.

Figure 8:
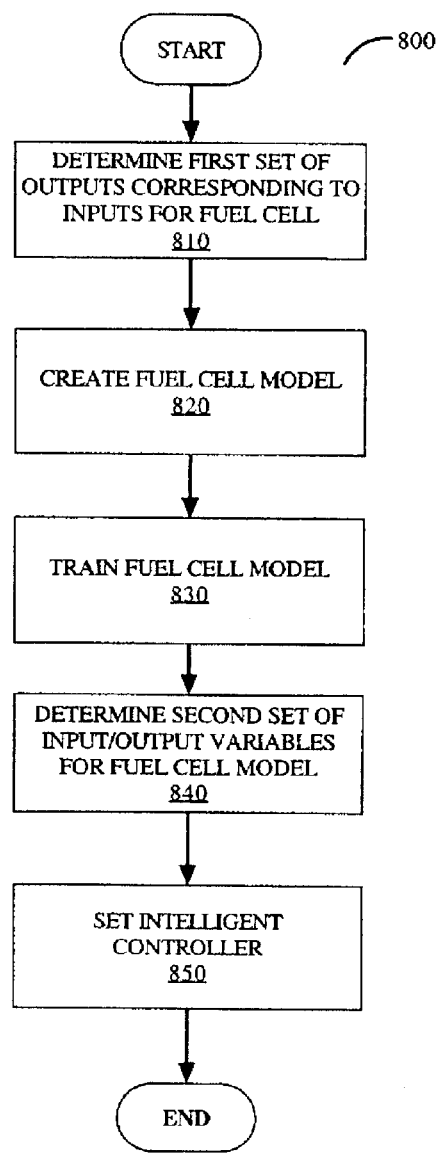
FIG. 8 is a flowchart of a method for configuring an intelligent controller to control a dynamic fuel cell.

In a further aspect, the dynamic fuel cell 110 can be modeled using an intelligent model that models nonlinear processes in order to emulate the operation of the dynamic fuel cell 110. For many engineering and science problems, in order to analyze or to optimize some processes, sometimes it is not possible nor necessary to perform costly laboratory experiments using the dynamic fuel cell 110 to get meaningful data over a wide spectrum of operation conditions, in order to configure the intelligent controller 120 to approximate input parameters that will result in a output voltage, Vcell, of the dynamic fuel cell 110 that is sufficiently close to the desired or demanded voltage. The intelligent model that is created is then used to determine a set of outputs and their corresponding set of inputs in order to train the intelligent controller 120. FIG. 8 is a flowchart of a method 800 for configuring the intelligent controller 120 to control the dynamic fuel cell 110, comprising the steps of: determining the output of a fuel cell for a given set of inputs to create a first data set 810; creating an intelligent model 820; training the intelligent model using the first data set to emulate the fuel cell 830; determining a second data set using the intelligent model 840; and configuring the intelligent controller 120 using the second data set 850.

The method 800 begins at step 810, where a first data set is determined comprising the values of a set of input parameters and the output resulting from the set of input parameters for the dynamic fuel cell 110. Typically, the output cell voltage is determined for a corresponding set of input parameters which comprise fuel variables, temperature, membrane dimensions, cell current and oxygen variables (the same input parameters that can be adjusted by the intelligent controller 120). The first data set does not have to be extensive with each set of possible input parameters and the resulting output for the entire operating range of the dynamic fuel cell 110, but rather just a subset of the range of operation of the dynamic fuel cell 110, with enough data to create a sufficient model of the dynamic fuel cell 110.

The first data set can be determined or obtained in a number of ways. The output resulting from a set of input parameters can be determined by calculating from the highly non-linear function equations and/or obtained from other trained intelligent systems and/or from experimentation.

The highly non-linear function equations can be solved, for various sets of input variables, to determine a calculated output of the dynamic fuel cell 110. In some cases it is possible to solve the equations describing the operation of the dynamic fuel cell 110. While these equations are complicated and highly non-linear making it hard to calculate solutions, they are not necessarily unsolvable. However, while they may be solvable, the time and effort needed to solve them for various input variables can be quite extensive; making it impractical to use the equations in the intelligent controller 120 where input parameters must be determined in real-time conditions. However, even with the time and effort required to solve the equations describing the operation of the dynamic fuel cell 110, because the creation of the first data set does not require it to be done under a real-time constraint, like the operation of the intelligent controller 120.

Experimentation on the dynamic fuel cell 110 can also be done to create the corresponding output values to input parameters values of the first data set. By varying the input parameters of the dynamic fuel cell 110 and recording the resulting output of the dynamic fuel cell 110 the first data set can be determined.

Figure 9:
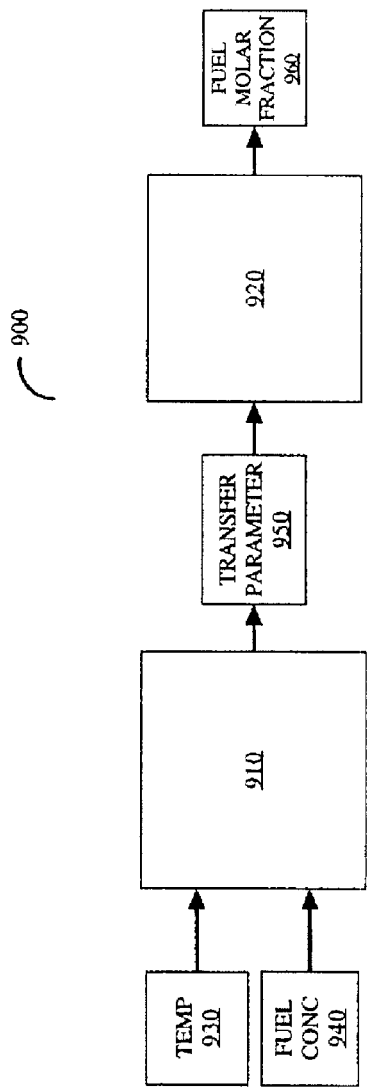
FIG. 9 is a schematic diagram of a first nonlinear process model and a second nonlinear process model which can be used to determine a first data set for the method illustrated in FIG. 8.

Alternatively, nonlinear process models can also be used to generate some initial data which can be used to determine the output values and corresponding input values for the first data set. FIG. 9 illustrates a schematic diagram of a model system 900 comprising a first nonlinear process model 910 and a second nonlinear process model 920, which are combined to calculate a fuel molar fraction in the membrane of the dynamic fuel cell 110. Each of the first nonlinear process model 910 and the second nonlinear process model 920 can be an artificial neural network, a fuzzy inference system, a neuro-fuzzy inference system and/or other advanced inference systems. The inputs to the first nonlinear process model 920 are temperature 930 and fuel concentration 940. The resulting output from the first nonlinear process model 920 is a transfer parameter 950. This transfer parameter 950 is then used as the input to the second nonlinear process model 920 which outputs a fuel molar fraction 960 of the fuel in the membrane of the dynamic fuel cell 110. This molar fraction 950 can then be used to determine the output current, $I_{cell}$, of the dynamic fuel cell 110. By using the inputs and outputs of the model system 900 shown in FIG. 9, the first data set can be determined for method 800, illustrated in FIG. 8. Additionally, the system 900 can be use without method 800 by just using it to create a data set to configure the control of the intelligent controller 120, directly, without requiring the construction of an intelligent model.

Figure 10:
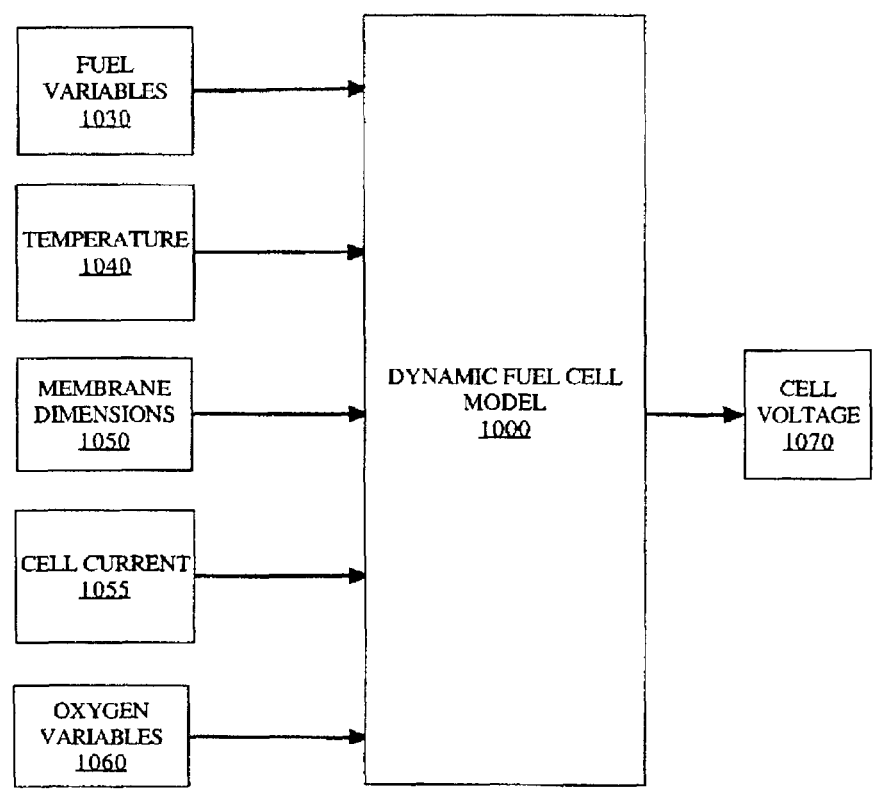
FIG. 10 is a schematic illustration of an intelligent model used to emulate the operation of a dynamic fuel cell for the method illustrated in FIG. 8.

Referring again to FIG. 8, at step 820, the dynamic fuel cell 110 is modeled using an intelligent system to emulate the behavior of the dynamic fuel cell 110 in the fuel cell control system 100. FIG. 10 illustrates a schematic illustration of an intelligent model 1000 used to emulate the operation of the dynamic fuel cell 110. The intelligent model 1000 has inputs of fuel variables 1030, temperature 1040, membrane dimensions 1050, cell current 1055 and oxygen variables 1060. The output of the intelligent model 1000 corresponding to these inputs is cell voltage 1070.

The intelligent model 1000 is a nonlinear process model and can be implemented using an artificial neural network, a fuzzy inference system, a neuro-fuzzy inference system (for example, although not necessarily, of the CANFIS type), and/or any other advanced inference system.

Referring again to FIG. 8, at step 830 the intelligent model 1000 is configured by training and/or tuning it using the input parameter values and corresponding output values contained in the first data set that was determined at step 810.

Once the intelligent model 1000 has been sufficiently configured by training it or properly parameter updating/tuning it, the intelligent model 1000 will closely approximate the voltage output, $V_{cell}$, for the dynamic fuel cell 110 for a given set of input parameters. Providing the values for the input parameters of the fuel variables 1030, the temperature 1040, the membrane dimensions 1050, the cell current 1055 and the oxygen variables 1060 to the intelligent model 1000, causes the intelligent model 1000 to approximate a voltage output 1070, which will be sufficiently close to or the same as the output of the dynamic fuel cell 110 for the provided input parameters. By changing any or all of the input parameters of the intelligent model 1000, an approximation of the cell voltage 1070 is provided by the intelligent model 1000.

At step 840, the intelligent model 1000 is used to determine a second data set of input parameter values and the corresponding approximated output in order to configure the intelligent controller 120 by training or tuning using the second data set. The second data set is created of a subset of inputs to the fuel cell model 1000 and the resulting cell voltage 1070 that is sufficient to train or update the intelligent controller 120.

At step 850, the intelligent controller 120 is configured by training and/or updating the intelligent controller 120 using the second data set generated at step 840 of the method 800.

Using method 800, the intelligent controller 120 is configured to provide approximations of the input parameters so that by adjusting the input parameters of the dynamic fuel cell 110 to the approximated input parameters, the output voltage, $V_{cell}$, will be sufficiently close to the voltage demanded or desired by the load 180.

Experimental data from the dynamic fuel cell 110, input and outputs calculated for the dynamic fuel cell 110 or the method 800 can also be used to configure a variety of intelligent controllers that can be used to adjust one or more of a number of different input parameters. An intelligent controller can be configured, to measure the voltage output, $V_{cell}$, the current output, $I_{cell}$, of the dynamic fuel cell 110 and any of the variable input parameters to the dynamic fuel cell 110 to approximate a value for any of the variable input parameters that the intelligent controller can adjust so that the dynamic fuel cell 110 has a voltage output, $V_{cell}$, the same or close to a voltage demanded or desired by a load 180. For example, FIGS. 11 through 14 show variations of an intelligent controller than can control various input parameters to have the dynamic fuel cell 110 produce an output voltage, $V_{cell}$, that is close to or the same as a voltage demanded by the load 180. A person skilled in the art will appreciate that any of the variable input parameters or any combination of the variable input parameters could be varied using an intelligent controller configured using the experimentally obtained data, data calculated for the dynamic fuel cell 110 or a data set obtained using method 800 shown in FIG. 8.

Figure 11:
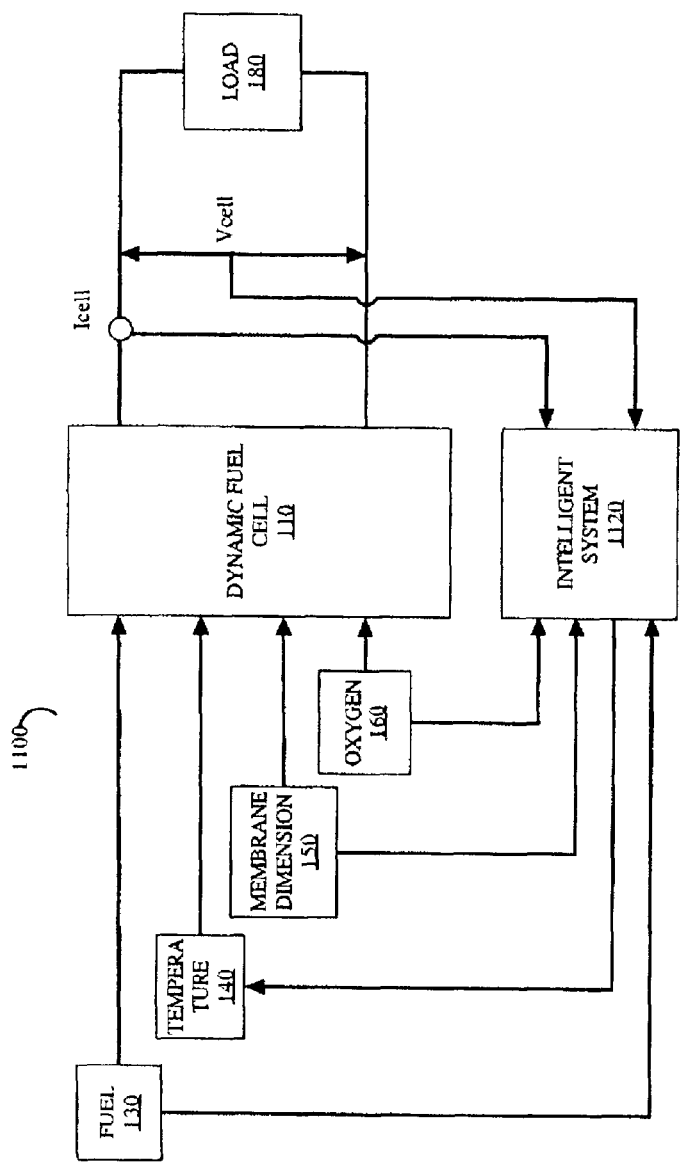
FIG. 11 is a variation of an intelligent controller used to control a dynamic fuel cell by varying input parameters related to the temperature of the dynamic fuel cell.

FIG. 11 illustrates a schematic illustration of a fuel cell control system 1100. Intelligent controller 1120 receives input of current output, $I_{cell}$, and voltage output, $V_{cell}$, as well as the input parameters of the fuel supply system 130, membrane dimension control system 150 and the oxygen supply system 160. With these inputs, the intelligent controller 1120 can approximate a temperature to result in a desired voltage output, $V_{cell}$, and adjust the temperature control system 140 as required. In this manner, the fuel supply system 130, membrane dimension control system 150 and the oxygen supply system 160 can have their input parameters varied independently of the intelligent controller 1120 to allow these systems to work within desired ranges independently of controlling the voltage to output, $V_{cell}$.

Figure 12:
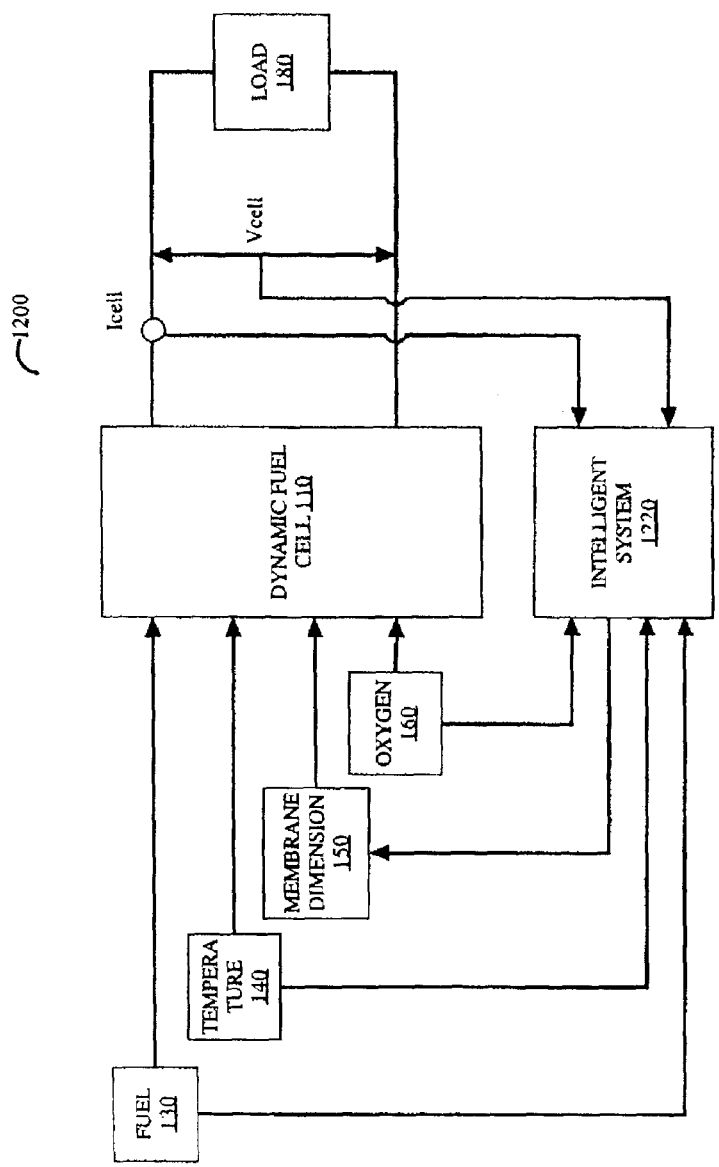
FIG. 12 is a further variation of an intelligent controller use to control a dynamic fuel cell by varying input parameters related to at least one dimension of a membrane.

FIG. 12 illustrates a schematic illustration of a fuel cell control system 1200. Intelligent controller 1220 receives input of current output, $I_{cell}$, and voltage output, $V_{cell}$, as well as the input parameters of the fuel supply system 130, temperature control system 140 and the oxygen supply system 160. With these inputs, the intelligent controller 1220 can approximate input parameters related to the membrane dimension to result in a desired voltage output, $V_{cell}$, and adjust the membrane dimension control system 150 as required. In this manner, the fuel supply system 130, temperature control system 140 and oxygen supply system 160 can have their input parameters varied independently of the intelligent controller 1220 to allow these systems to work within desired ranges independently of controlling the voltage output, $V_{cell}$.

Figure 13:
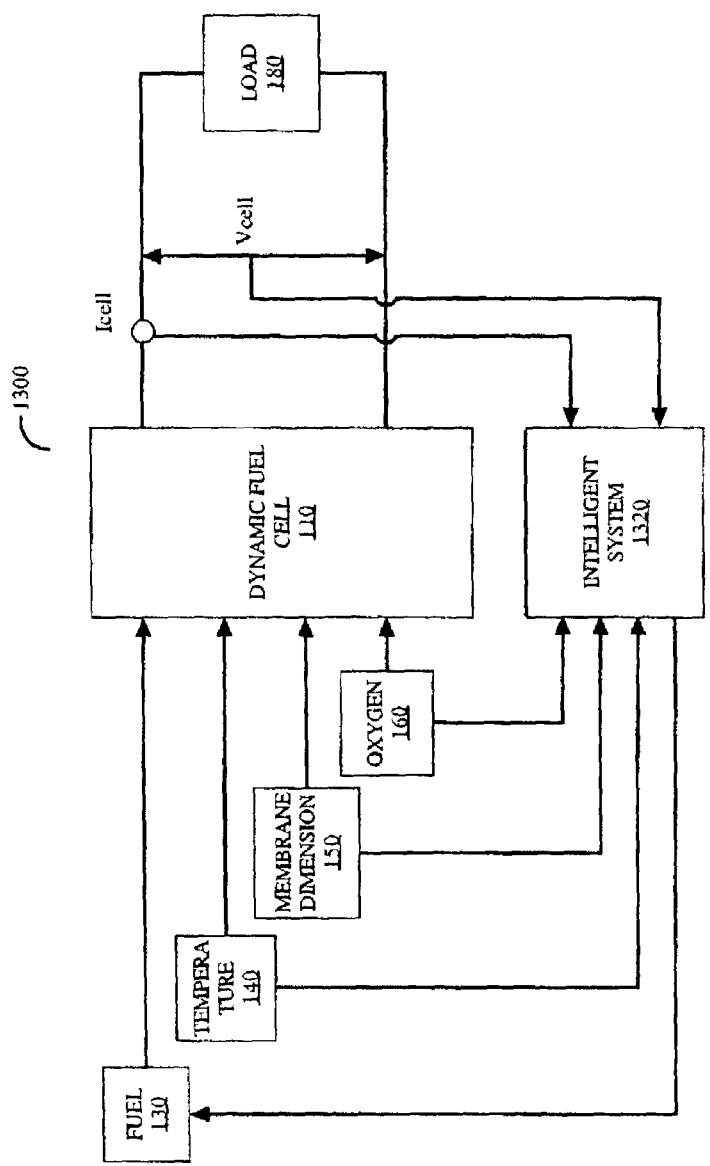
FIG. 13 is a further variation of an intelligent controller use to control a dynamic fuel cell by varying input parameters related to the fuel supply system of the dynamic fuel cell.

FIG. 13 illustrates a schematic illustration of a fuel cell control system 1300. Intelligent controller 1320 receives input of current output, $I_{cell}$, and voltage output, $V_{cell}$, as well as the input parameters of the temperature control system 150, membrane dimension control system 150 and oxygen supply system 160. With these inputs, the intelligent controller 1320 can approximate input parameters related to the fuel supply to result in a desired voltage output, $V_{cell}$, and adjust the fuel supply system 130 as required. In this manner, temperature control system 140, membrane dimension control system 150 and oxygen supply system 160 can have their input parameters varied independently of the intelligent controller 1320 to allow these systems to work within desired ranges independently of controlling the voltage output, $V_{cell}$.

Figure 14:
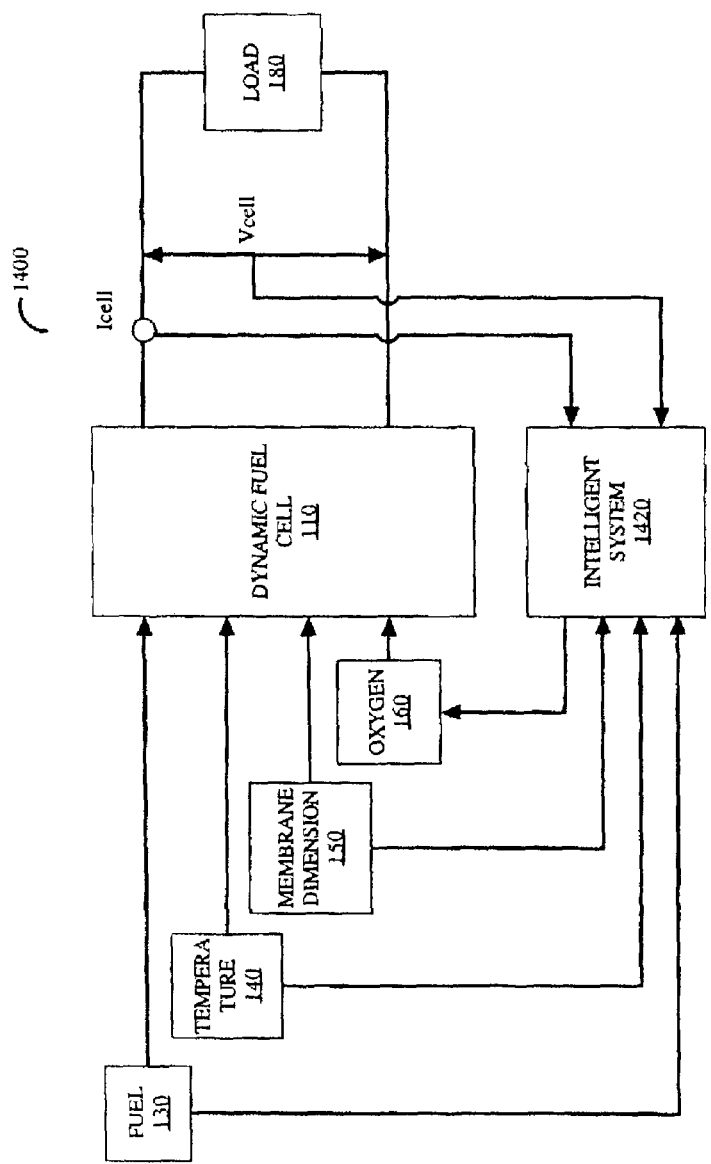
FIG. 14 is a further variation of an intelligent controller use to control a dynamic fuel cell by varying input parameters related to an oxygen supply system of the dynamic fuel cell.

FIG. 14 illustrates a schematic illustration of a fuel cell control system 1400. Intelligent controller 1420 receives input of current output, $I_{cell}$, and voltage output, $V_{cell}$, as well as the input parameters of the fuel supply system 130, temperature control system 140 and membrane dimension control system 150. With these inputs, the intelligent controller 1420 can approximate input parameters related to the oxygen supply to result in a desired voltage output, $V_{cell}$, and adjust the oxygen supply system 160 as required. In this manner, the fuel supply system 130, temperature control system 140 and membrane dimension control system 150 can have their input parameters varied independently of the intelligent controller 1420 to allow these systems to work within desired ranges independently of controlling the voltage output, $V_{cell}$.

FIGS. 11-14 only show various implementations of an intelligent controller that measures various variable input parameters to control the output voltage, $V_{cell}$, of the dynamic fuel cell 110. However, a person skilled in the art will appreciate that other variations could also be implemented.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in to structure or operation which may be resorted to are intended to fall within the scope of the claimed invention.

What is claimed is:

1. A fuel cell system comprising:
 a fuel cell having a membrane between an anode and a cathode;
 a membrane dimension control system associated with the fuel cell and operable to change an effective dimension of the membrane;
 an intelligent controller operatively connected to sense at least one of an output voltage and an output current of the fuel cell and operatively connected to an input of said membrane dimension control system;
 said intelligent controller programmed to determine an approximated effective membrane dimension for a desired output voltage of the fuel cell using a non-linear process model and configured to, based on said approximated effective membrane dimension, directly control said membrane dimension control system to selectively adjust said effective dimension of said membrane to said approximated effective membrane dimension, wherein the effective dimension is at least one of thickness of the membrane and contact area between the membrane and at least one of the anode layer and the cathode layer and wherein the approximated effective membrane dimension is at least one of an approximated thickness of the membrane and an approximated contact area between the membrane and at least one of the anode layer and the cathode layer.

2. The system of claim 1 wherein the membrane dimension control system is arranged for changing said thickness of the membrane.

3. The system of claim 1 further comprising a fuel input system and wherein the controller is operatively connected to said fuel input system to control an amount of fuel input to the fuel cell.

4. The system of claim 1 wherein the nonlinear process model is at least one of an artificial neural network; a fuzzy inference model; a neuro-fuzzy inference model; and an advanced inference system.

5. The system of claim 2 wherein the membrane comprises a plurality of layers.

6. The system of claim 1 wherein said membrane dimension control system is arranged to control a contact area of the membrane with at least one of said anode and said cathode in order to change said effective dimension of said membrane.

7. The system of claim 6 further comprising a fuel supply system for said fuel cell, an oxygen supply system for said fuel cell and a temperature control system for said fuel cell and wherein the controller is operatively connected to control said oxygen supply system, said fuel supply system and said temperature control system of the fuel cell.

8. The system of claim 6 wherein the controller is arranged to approximate a given contact area of said membrane for a desired output voltage using a non-linear process model and wherein the nonlinear process model is at least one of an artificial neural network; a fuzzy inference model; a neuro-fuzzy inference model; and an advanced inference system.

9. The system of claim 6 wherein the membrane comprises a plurality of layers.

10. The system of claim 1 wherein the intelligent controller is configured by using a nonlinear process model of the fuel cell that was configured using a first data set determined for the fuel cell and then using the configured nonlinear process model to generate a second data set that is used to configure the intelligent controller.

11. The system of claim 1 wherein:
said anode comprises at least one anode layer operative to receive a fuel;
said cathode comprises at least one cathode layer operative to receive an oxidant; and
said membrane separates the at least one anode layer and at least one cathode layer.

12. The system of claim 2 wherein said membrane dimension control system is arranged for applying a force to said membrane to stretch said membrane.

13. The system of claim 11 wherein said membrane dimension control system is arranged for applying a force to outside faces of said at least one anode layer and said at least one cathode layer to compress said membrane.

14. The system of claim 11 wherein said at least one anode layer, said at least one cathode layer, and said membrane have a common axis and said membrane dimension control system is arranged for rotating said at least one anode layer in one direction and said at least one cathode layer in an opposite direction about said axis so as to twist said membrane and thereby reduce the thickness of said membrane.

15. The system of claim 1 wherein said membrane is fabricated of a material which is sensitive to electric pulses and said membrane dimension control system comprises a pair of electrodes disposed at either end of said membrane.

16. The system of claim 5 wherein said membrane comprises an inner liquid layer and said membrane dimension control system is arranged to supply fluid to, or evacuate fluid from, said liquid layer.

17. The system of claim 2 wherein said membrane dimension control system is arranged for bending said anode and said cathode to vary said thickness of said membrane.

18. The system of claim 6 wherein said membrane dimension control system is arranged for bending said anode and said cathode away from said membrane.

19. The system of claim 6 wherein said membrane dimension control system is arranged for translating at least one of said anode and said cathode relative to said membrane.

20. The system of claim 6 wherein said membrane dimension control system is arranged for rotating at least one of said anode and said cathode relative to said membrane.

21. The system of claim 1 wherein said controller is programmed to continuously determine said approximated effective membrane dimension and configured to continuously directly control said membrane dimension control system to selectively change said effective dimension of said membrane.

22. The system of claim 21 further comprising a fuel input system for said fuel cell, an oxygen supply system for said fuel cell, and a temperature control system for said fuel cell and wherein the controller is operatively connected to control said fuel input system, said oxygen supply system, and said temperature control system of the fuel cell.

23. The system of claim 22 wherein said controller is programmed to continuously approximate each of an amount of fuel, an amount of oxygen, and a temperature to achieve said desired output voltage of the fuel cell, and configured to directly and continuously control said fuel input system, said oxygen supply system, and said temperature control system accordingly.

24. The system of claim 22 wherein said controller is configured to directly and simultaneously control said fuel input system, said oxygen supply system, and said temperature control system.

25. The system of claim 2 wherein the nonlinear process model is at least one of an artificial neural network; a fuzzy inference model; a neuro-fuzzy inference model; and an advanced inference system.

26. The system of claim 6 wherein the nonlinear process model is at least one of an artificial neural network; a fuzzy inference model; a neuro-fuzzy inference model; and an advanced inference system.

* * * * *